(12) United States Patent
Eysel et al.

(10) Patent No.: US 6,468,928 B2
(45) Date of Patent: Oct. 22, 2002

(54) TRANSLUCENT SHEETS

(75) Inventors: Konrad Eysel, Kuchen/Fils; Lothar Bargiel, Uhingen; Walter Rother, Reichenbach; Günther Vogt, Rinteln, all of (DE)

(73) Assignee: Benecke-Kaliko AG, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,980

(22) Filed: May 11, 1999

(65) Prior Publication Data

US 2001/0051480 A1 Dec. 13, 2001

(30) Foreign Application Priority Data

May 29, 1998 (DE) ........................................ 198 24 058

(51) Int. Cl.$^7$ .......................... B32B 27/04; B32B 27/12; B32B 5/12
(52) U.S. Cl. ........................... 442/45; 442/38; 442/41; 442/43; 442/46; 442/47; 442/49; 442/304; 428/105; 428/113; 428/114; 428/119
(58) Field of Search .............................. 442/38, 41, 43, 442/45, 46, 47, 49, 304; 428/105, 113, 114, 119

(56) References Cited

U.S. PATENT DOCUMENTS

| 4,159,360 | A | * | 6/1979 | Kim ........................... 428/195 |
| 4,656,073 | A | * | 4/1987 | Harris ......................... 428/85 |
| 5,773,373 | A | * | 6/1998 | Wynne et al. ............... 442/260 |
| 6,054,178 | A | * | 4/2000 | Howells ....................... 427/209 |

FOREIGN PATENT DOCUMENTS

| DE | 84 35 406 | 3/1985 |
| DE | 33 45 183 | 6/1985 |
| DE | 39 00 846 | 7/1990 |
| DE | 92 06 365 | 9/1992 |
| EP | 0 807 708 | 7/1989 |

OTHER PUBLICATIONS

"Schussraschelgewirk als Beschichtungsträger", Melliand Textilberichte, Jun. 1985, pp. 434–435.

* cited by examiner

Primary Examiner—Elizabeth M. Cole
Assistant Examiner—Ula C. Ruddock
(74) Attorney, Agent, or Firm—Collard & Roe, P.C.

(57) ABSTRACT

A translucent sheet is made of a textile net middle layer that is between two cover layers made of translucent films. In the middle layer, areas of the mesh run at an angle to the main direction of stress. In addition, there are stabilizing threads that run in the main direction of stress and are bonded to the knots of the textile net middle layer and give the structure of the middle layer particular strength in the main direction of stress.

20 Claims, 1 Drawing Sheet

TRANSLUCENT SHEETS

BACKGROUND OF THE INVENTION

1. Field of the Invention

The present invention concerns a translucent sheet laminated article comprising a textile net middle layer between two cover layers each composed of translucent film.

2. The Prior Art

Translucent sheets are used for tents, marquees, construction sheeting or roofing paper. Products that are very mechanically stable consist of several layers. The layered structure comprises a textile, net-like middle layer and two cover layers that enclose the textile middle layer. The textile middle layer provides mechanical stability. The net-like structure also allows light to pass through. The two cover layers made of transparent films fix the textile net-like middle layer and seal against water and wind.

To absorb force in the primary direction of stress, the fibers of the textile, net-like middle layer must extend in the main direction of stress. During production, particularly high force arises in the direction of production. However, force can also arise when the finished sheet is used that may be concentrated in one particular direction. Such force can result e.g. from wind or precipitation.

Meeting the mechanical requirements has limited the design of the network. The design has therefore been limited to rectangular and square meshes. This design is insufficient for decorative products because the mesh is visible due to the translucence of the sheet.

SUMMARY OF THE INVENTION

It is an object of the present invention to provide an improved translucent sheet that allows greater freedom in designing the mesh while retaining mechanical stability.

The above object is achieved by providing a translucent sheet laminated article comprising a top cover layer made of a translucent film; a bottom cover layer made of a translucent film; a textile net middle layer that is between said two cover layers having areas of a mesh of the textile net middle layer which are at an angle to a main direction of stress, and said middle layer having stabilizing threads aligned with the main direction of stress, and said stabilizing threads are bonded to areas or knots of the textile net middle layer that run in the same direction as said threads.

In the laminated article according to the invention, the mesh can have any design. When areas of the mesh of the textile net middle layer are at an angle to the main direction of stress and cannot therefore absorb force in the main direction of the stress, the stabilization threads in the main direction of force absorb the force completely. This also means that the mesh shape intended by the designer is retained during production. Hence the mesh is not distorted by forces arising in production.

The sandwich structure of the textile net middle layer and the cover layers yields a basic mechanical strength after production. The stabilizing threads increase strength in the direction in which they run. When there is a main direction of stress, the translucent sheet is aligned so that the stabilizing threads run in the main direction of stress.

In one embodiment of the invention, the cross-section of the fibers forming the mesh is greater than the cross-section of the stabilizing fibers. The bond of the fibers forming the mesh to the cover layers therefore becomes tighter. At the same time, the stabilizing fibers become less visually prominent than the fibers forming the mesh.

The mesh can be polygonal. This produces a type of honeycomb pattern in which parts of the mesh form parts of adjacent mesh. This produces a favorable ratio between the open and hence translucent areas of the mesh and the areas occupied by the fibers of the mesh. A particularly high basic strength results from the bond between the textile net middle layer and the cover layers in all directions within the plane of the sheet.

The mesh width can be 2 mm to 10 mm. This dimension represents an optimum compromise between light permeability and mechanical strength.

The textile net middle layer preferably comprises a knit. This type of textile yields a particularly good bond between the individual fibers forming the mesh and the stabilizing fibers.

The fibers of the mesh can be a multitwisted monofilament yarn. This improves the bonding of the knots of the mesh to themselves and the bond between the fibers of the textile middle layer and the cover layers.

The material of the textile net middle layer can comprise synthetic raw materials, preferably polyester, polyamide, polyaramide, polyimide or mixtures thereof. These raw materials have a reduced tendency to stretch and yield under tension. This ensures that the sheet retains its form and shape under stretching.

The material of the textile net middle layer can be colored. This allows the textile structure to be visually distinguished from the stabilizing threads so that the stabilizing threads become practically invisible. In. addition, the overall sheet can be in the form of an ornamental structure.

The textile net middle layer can be 0.3–0.6 mm thick, and preferably 0.35 mm thick. This dimension represents the best compromise between mechanical strength and flexibility, i.e., its bending or folding property.

The two cover layers are preferably comprised by a thermoplastic material, and they are melted together through the meshes of the textile net middle layer to form the laminated article. This produces a very precise geometric structure of the sheet that ensures that the textile net middle layer assumes a precise position between the two cover layers. In addition, a tight bond between the cover layers is ensured.

The thermoplastic can be made with a calender or extruder. This embodiment produces a very homogenous cover layer with a uniform thickness.

The thermoplastic material is preferably comprised by soft PVC, thermoplastic olefins or polyurethane. This material is particularly yielding and adheres well to provide a tight bond to the textile material.

In another embodiment, it is possible for at least the top cover layer to contain antioxidants and UV absorbers and/or IR absorbers. This ensures long life while maintaining the useful properties even when the sheet is continuously exposed to the weather and to sunlight.

In a further embodiment, one of the cover layers can contain a color agent, such as dyes and/or pigments. It is also possible for the two cover layers to contain different dyes and/or pigments. In addition to decorative possibilities for the sheet, the light permeability, or the color of the transmitted light and the permeability to or absorption/reflection of IR or UV rays can be influenced.

The cover layers can be 0.3–0.45 mm thick and preferably 0.35 mm thick depending on the middle layer. This dimension for the thickness of the cover layers provides sufficient cover and encasing for the fibers of the middle layer.

In a further embodiment, at least one of the cover layers can have an embossed surface. This increases the construction possibilities of the sheet and influences the stability and bendability of the sheet.

In another embodiment, the top cover layer can have an additional translucent varnish coating or layer thereon. This varnish layer can protect the cover layer. In particular, it protects against microorganisms that can collect on the surface under the influence of weather in the form of moss or algae.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
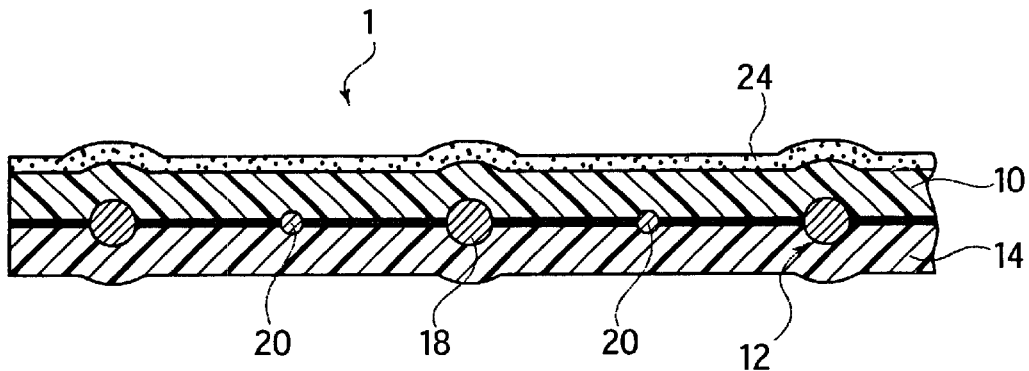
FIG. 1 shows a cross-section view of a translucent sheet laminated article according to the invention.

Turning now in detail to the drawings, FIG. 1 shows a cross-section of a laminated article 1 from top to bottom. Article 1 comprises a top cover layer 10 made of a translucent thermoplastic film, a middle layer 12 comprising a textile, net-like knit, and a bottom cover layer 14 made of a translucent, thermoplastic film. The middle layer 12 is made of a mesh whose fibers 18 are formed by a multitwisted monofilament yarn. In addition, stabilizing threads 20 are knitted into the yarn that are bonded to areas or knots 22 (FIG. 2) of the mesh 16 of the textile, net-like middle layer 12 that run in the same direction. The section is transverse to the stabilizing threads 20 in the drawing. The main direction of stress 26 of the material therefore also runs transverse to the represented section plane.

The top and bottom cover layers 10,14 are melted together into the gaps of the middle layer 12 to produce the laminated article 1. They completely enclose the fibers 18 and the stabilizing threads 20. The textile middle layer 12 is therefore completely integrated into the sheet. The top and/or bottom cover layers 10,14 can be colored. Hence, pigments can be used within the cover layers 10,14 to create the colors. The pigments can be translucent or light-absorbing or light-reflecting. The top cover layer 10 also has a varnish coating 24. The surface of the cover layers 10,14 have a textured structure that results from the layers 10,14 adapting to the structure provided by the textile net middle layer 12.

Figure 2:
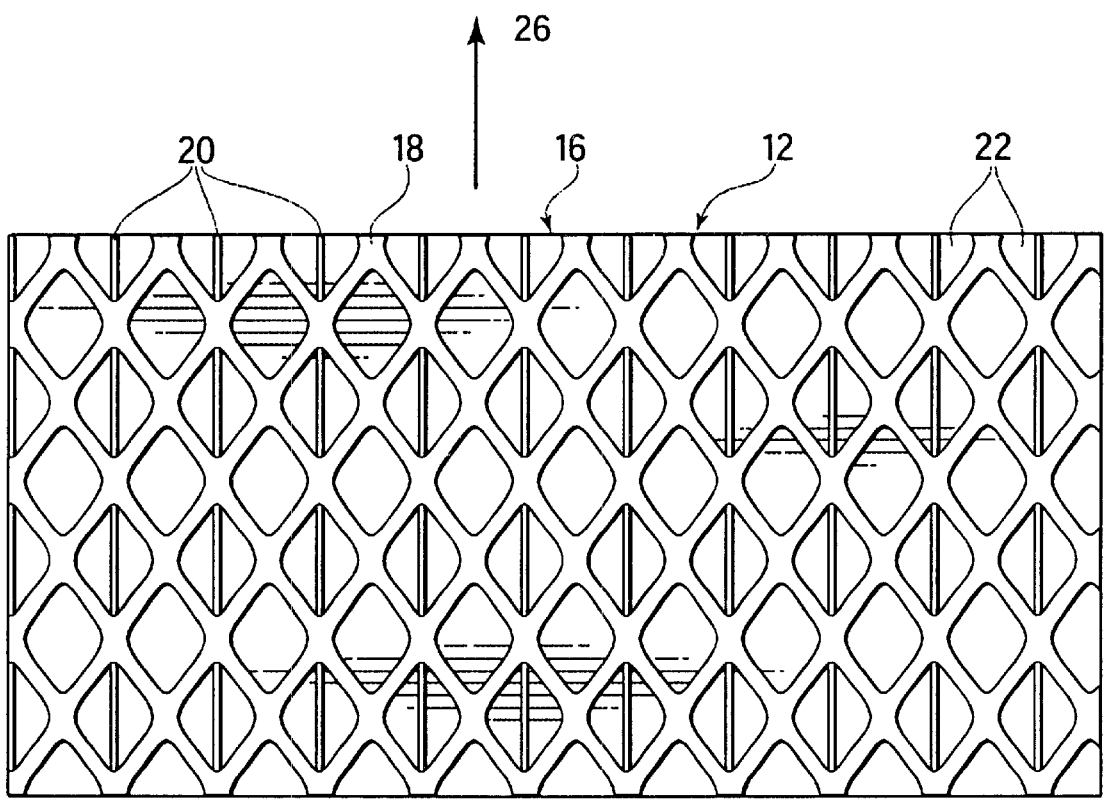
FIG. 2 shows a top view of the translucent sheet of FIG. 1.

FIG. 2 shows a top view of the translucent sheet where the textile net middle layer 12 is visible through the top cover layer and can be recognized. The structure of the mesh 16 of the middle layer 12 is preferably hexagonal, such as a honeycomb structure. The threads of the mesh 16 extend at an angle relative to the lateral edges of the translucent sheet. The stabilizing threads 20 that run in the main direction of stress 26 run through the mesh 16. Threads 20 are knit with the areas of the mesh 16 that run in the same direction, or threads 20 are bonded as knots 22. The mesh 16 is tightly bonded to the stabilizing threads 20. In addition, it can be seen that the diameter and cross-section of the fibers 18 of the mesh 16 is greater than the diameter and cross-section of the stabilizing threads 20.

The laminated article of the invention is particularly useful for vehicles as a translucent folding roof or as a sunroof. The increased mechanical strength along the direction of the stabilizing threads 20 is advantageous. The increased strength helps absorb force that arises when closing the folding roof, and absorbs force from suction due to wind during travel without the material stretching undesirably.

Accordingly, while a few embodiments of the present invention have been shown and described, it is to be understood that many changes and modifications may be made thereunto without departing from the spirit and scope of the invention as defined in the appended claims.

What is claimed is:

1. A translucent sheet laminated article having lateral parallel edges, comprising a top cover layer made of a translucent film (10); a bottom cover layer made of a translucent film (14); a textile net middle layer (12) that is between said two cover layers (10, 14) having areas of a mesh (16) of the textile net middle layer, wherein the textile net defines a plane, said mesh having a polygonal pattern and having threads extending at an angle in relation to said lateral edges of said sheet; and said middle layer (12) having stabilizing threads (20) aligned only in the main direction of stress (26) said stabilizing threads being bonded to areas or knots (22) of the textile net middle layer that run in the same direction as said threads (20), wherein said stabilizing threads are in the same plane as the textile net and keep the polygonal pattern of the mesh from deforming.

2. A translucent sheet according to claim 1,
wherein said mesh is formed by fibers (18); and
wherein a cross-section of fibers (18) forming the mesh (16) is greater than a cross-section of the stabilizing threads (20).

3. A translucent sheet according to claim 2,
wherein the fibers (18) of the mesh (16) comprise multitwisted monofilament yarn.

4. A translucent sheet according to claim 1,
wherein the mesh (16) is polygonal.

5. A translucent sheet according to claim 1,
wherein the mesh (16) is 2–10 mm wide.

6. A translucent sheet according to claim 1,
wherein the textile net middle layer (12) is a knit.

7. A translucent sheet according to claim 1,
wherein the textile net middlelayer (12) comprises a synthetic raw material selected from the group consisting of polyester, polyamide, polyaramid, polyimide, and mixtures thereof.

8. A translucent sheet according to claim 1,
wherein the textile net middle layer (12) contains a color agent.

9. A translucent sheet according to claim 1,
wherein the textile net middle layer (12) has a thickness of 0.3–0.6 mm.

10. A translucent sheet according to claim 1,
wherein each of the two cover layers (10,14) comprises a thermoplastic material, and said cover layers are melted together through the mesh (16) of the textile net middle layer (12).

11. A translucent sheet according to claim 10,
wherein the thermoplastic material is created with a calender or an extruder.

12. A translucent sheet according to claim 10, wherein the thermoplastic material is selected from the group consisting of soft PVC, thermoplastic olefins, and polyurethane.

13. A translucent sheet according to claim 10, wherein at least the top cover layer contains an antioxidant, a UV absorber or an IR absorber.

14. A translucent sheet according to claim 1, wherein at least one of said cover layers (10,14) contains a color agent selected from the group consisting of a dye and a pigment.

15. A translucent sheet according to claim 14, wherein one of the two cover layers (10,14) contain a different dye or a different pigment from that contained in the other cover layer.

16. A translucent sheet according to claim 1, wherein each of the cover layers (10, 14) has a thickness of 0.3–0.45 mm depending on the middle layer (12).

17. A translucent sheet according to claim 1, wherein at least one of the cover layers (10,14) has an embossed surface.

18. A translucent sheet according to claim 1, wherein the top cover layer (10) has a translucent varnish coating (24).

19. A translucent sheet according to claim 1, a translucent folding roof for automobiles.

20. A translucent sheet according to claim 1, comprising wherein the textiles net middle layer (12) has a thickness of 0.35 mm; and wherein each of the cover layers (10, 14) has a thickness of 0.35 mm.

* * * * *